US010003588B2

(12) United States Patent
Abe

(10) Patent No.: US 10,003,588 B2
(45) Date of Patent: Jun. 19, 2018

(54) NETWORK AUTHENTICATION SYSTEM, NETWORK AUTHENTICATION METHOD AND NETWORK AUTHENTICATION SERVER

(71) Applicant: NEC Corporation, Minato-ku, Tokyo (JP)

(72) Inventor: Yuji Abe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 113 days.

(21) Appl. No.: 15/060,836

(22) Filed: Mar. 4, 2016

(65) Prior Publication Data

US 2016/0285846 A1    Sep. 29, 2016

(30) Foreign Application Priority Data

Mar. 27, 2015 (JP) ................................ 2015-065388

(51) Int. Cl.
*H04L 9/00* (2006.01)
*H04L 29/06* (2006.01)
(Continued)

(52) U.S. Cl.
CPC .......... *H04L 63/08* (2013.01); *H04L 63/0236* (2013.01); *H04N 21/25816* (2013.01); *H04N 21/63* (2013.01)

(58) Field of Classification Search
CPC ............... H04L 63/308; H04L 63/0236; H04L 21/25816; H04L 21/63
See application file for complete search history.

(56) References Cited

U.S. PATENT DOCUMENTS 7,735,114 B2*  6/2010  Kwan ..................... H04L 63/08
                                                             455/410
8,151,318 B1*  4/2012  DeSanti ................ H04L 49/357
                                                             370/244
(Continued)

FOREIGN PATENT DOCUMENTS

JP          2004-350052 A       12/2004
JP          2011-048504    *     3/2011  ............. G06F 21/20
(Continued)

OTHER PUBLICATIONS

Japanese Office Action for JP Application No. 2015-065388 dated Jun. 6, 2017 with English Translation.
(Continued)

*Primary Examiner* — Sharon Lynch

(57) ABSTRACT

A network authentication system includes a client terminal, an authentication server authenticating connection of the client terminal with an external network, and a plurality of authentication switches controlling communication of the client terminal with the external network. The authentication switch includes an authentication server processing unit notifying the authentication server of authentication terminal information, and a receiving port filter receives a specific packet. The authentication server, includes a terminal management storing unit storing the authentication terminal information, and an authentication switch management processing unit which, in order that the authentication switch authenticate the client terminal, determines filter information, that is set in the receiving port filter, based on the authentication terminal information, and notifies the authentication switch of the filter information. The authentication server processing unit updates the receiving port filter based on the filter information.

7 Claims, 17 Drawing Sheets

(51) Int. Cl.
*H04N 21/63* (2011.01)
*H04N 21/258* (2011.01)

(56) References Cited

U.S. PATENT DOCUMENTS

| | | | | |
|---|---|---|---|---|
| 8,239,929 B2* | 8/2012 | Kwan | ............... | H04L 63/08 709/201 |
| 9,674,195 B1* | 6/2017 | Jiang | ............... | H04L 63/10 |
| 2002/0073232 A1* | 6/2002 | Hong | ............... | H04L 29/06 709/238 |
| 2004/0053601 A1* | 3/2004 | Frank | ............... | G01S 5/0252 455/411 |
| 2004/0268140 A1* | 12/2004 | Zimmer | ............... | G06F 21/575 726/3 |
| 2005/0053067 A1* | 3/2005 | Yasukawa | ............... | H04L 12/5601 370/389 |
| 2005/0055570 A1* | 3/2005 | Kwan | ............... | H04L 63/08 726/4 |
| 2008/0056161 A1* | 3/2008 | Okita | ............... | H04L 41/00 370/254 |
| 2008/0159310 A1* | 7/2008 | Senga | ............... | H04W 36/0038 370/401 |
| 2010/0015947 A1* | 1/2010 | Heo | ............... | G08G 1/205 455/410 |
| 2010/0223654 A1* | 9/2010 | Kwan | ............... | H04L 63/08 726/1 |
| 2012/0233657 A1* | 9/2012 | Guevin | ............... | H04L 63/10 726/1 |
| 2012/0259992 A1* | 10/2012 | Koehler | ............... | H04W 76/022 709/229 |
| 2013/0182581 A1* | 7/2013 | Yeung | ............... | H04L 12/1877 370/244 |
| 2015/0304220 A1 | 10/2015 | Miyao | | |

FOREIGN PATENT DOCUMENTS

| | | | |
|---|---|---|---|
| JP | 2011-048504 A | 3/2011 | |
| JP | 2013-098769 A | 5/2013 | |
| JP | 2014-171078 | * 9/2014 | ............ H04L 12/66 |
| JP | 2014-171078 A | 9/2014 | |
| WO | 2014/080994 A1 | 5/2014 | |

OTHER PUBLICATIONS

Japanese Office Action for JP Application No. 2015-065388 dated Dec. 26, 2017 with English Translation.

* cited by examiner

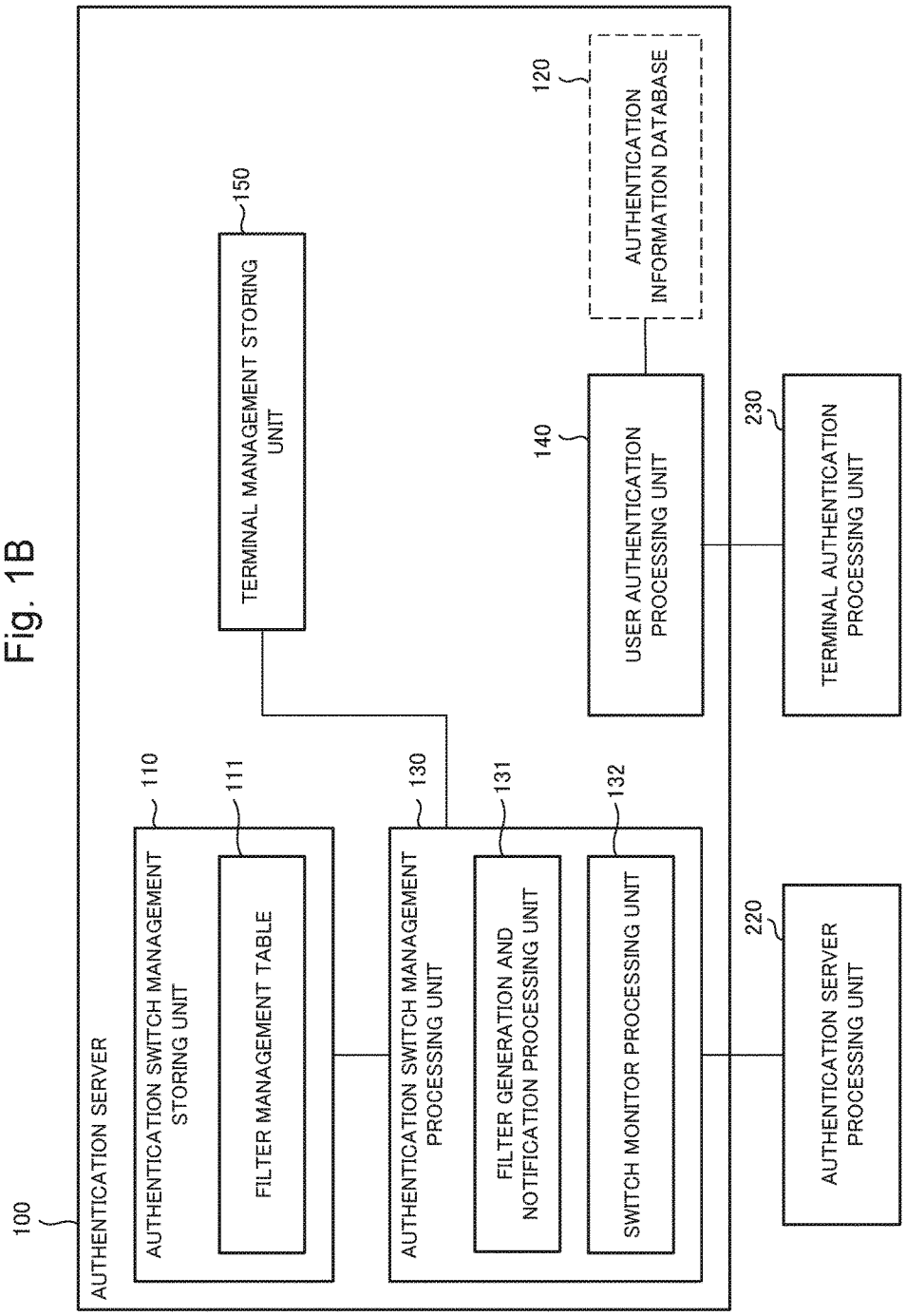

Fig. 5

FILTER MANAGEMENT TABLE 111

| SWITCH ID | MAC FILTER (ADDRESS/MASK) |
|---|---|
| SW-A | 00:00:00:00:00:01/00:00:00:00:00:01 |
| SW-B | 00:00:00:00:00:00/00:00:00:00:00:01 |

Fig. 6

TERMINAL MANAGEMENT STORING UNIT 150

| TERMINAL ADDRESS | SWITCH ID OF SWITCH TO WHICH TERMINAL BELONGS | COMMUNICATION TRAFFIC VOLUME |
|---|---|---|
| xx:xx:xx:01:12:23 | SW-A | 100 |
| yy:yy:yy:45:56:67 | SW-A | 200 |
| zz:zz:zz:89:9a:ab | SW-A | 50 |
| rr:rr:rr:12:23:34 | SW-B | 300 |
| ss:ss:ss:56:67:78 | SW-B | 20 |
| tt:tt:tt:9a:ab:bc | SW-B | 150 |

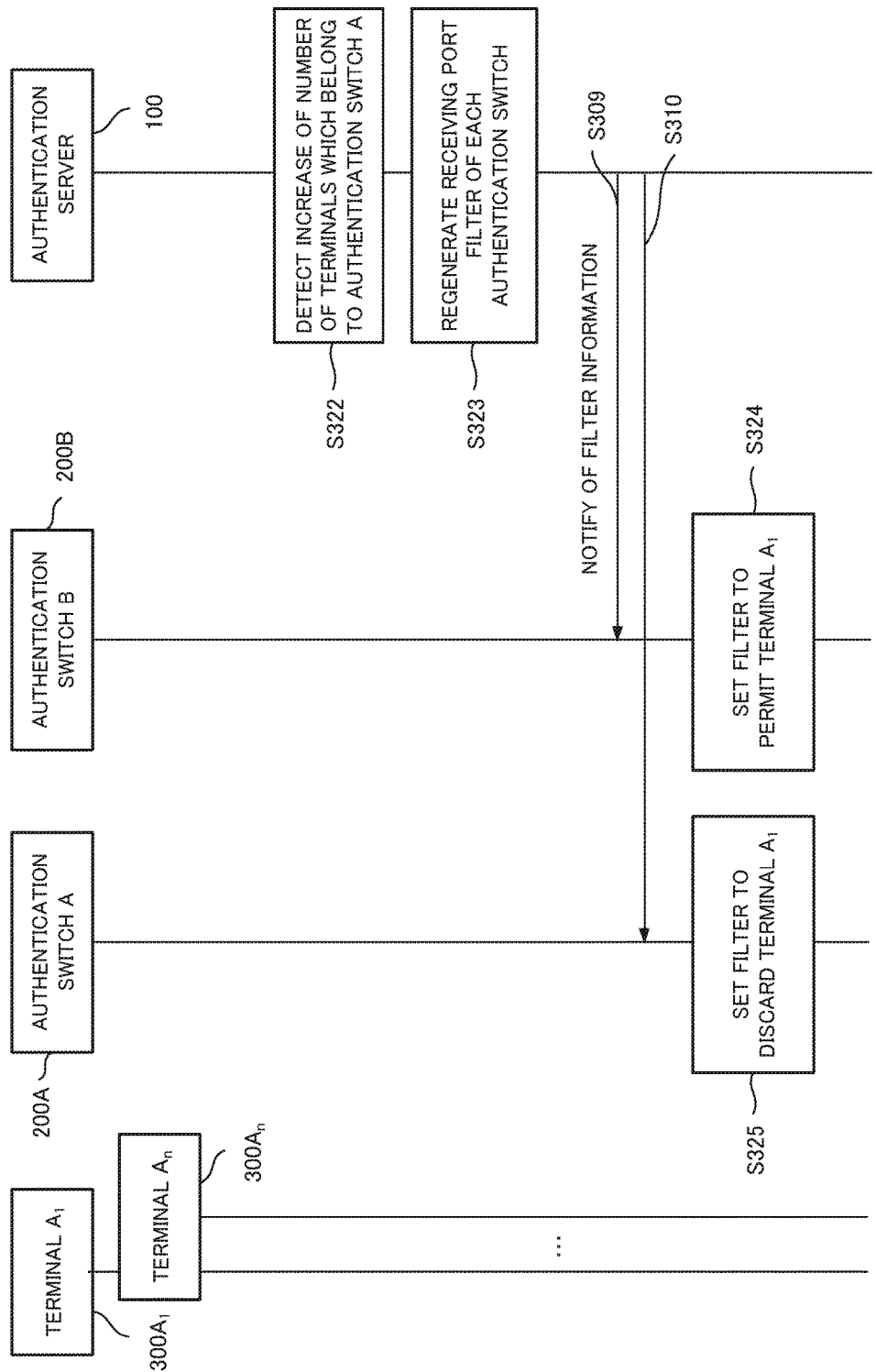

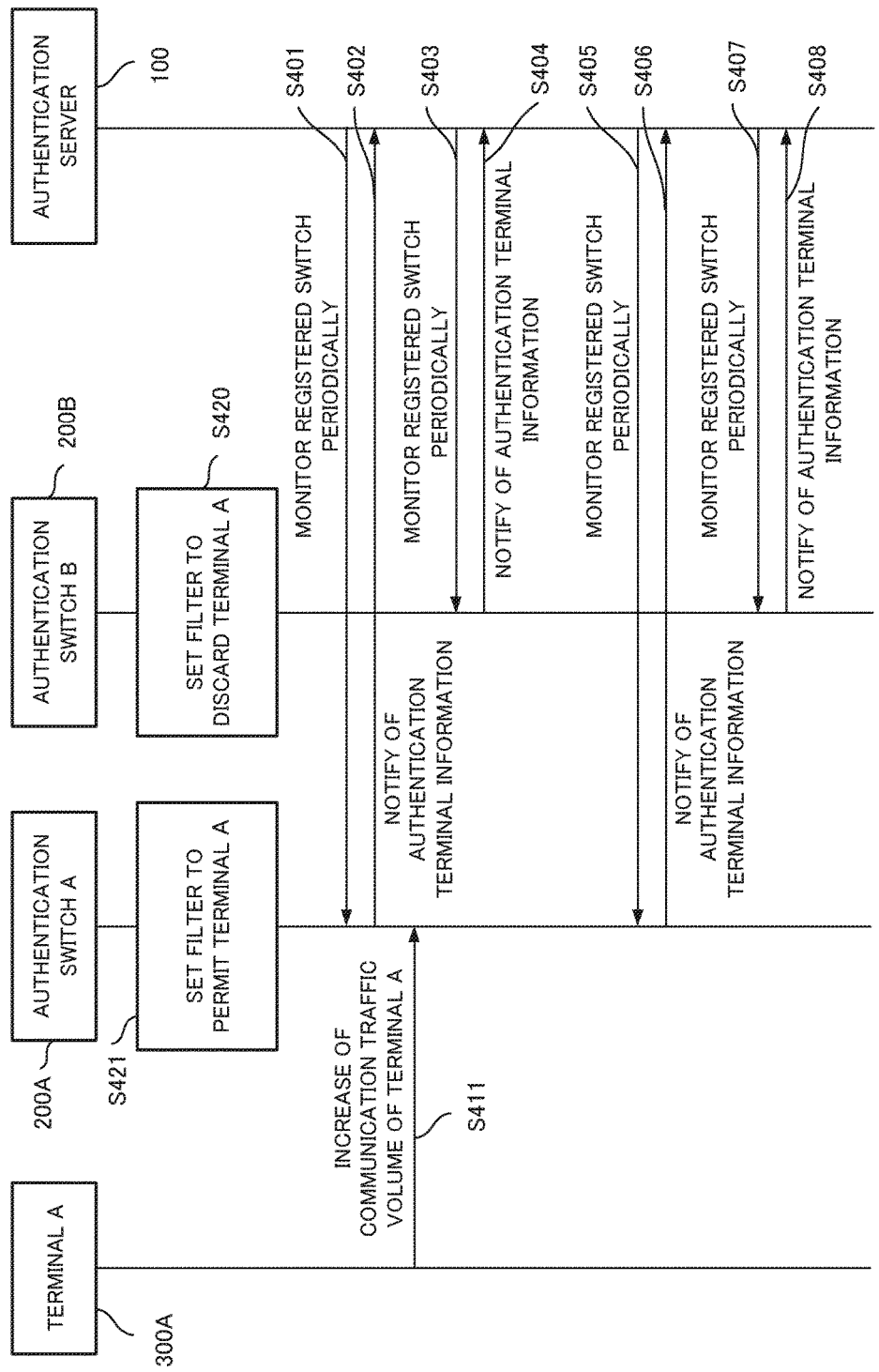

NETWORK AUTHENTICATION SYSTEM, NETWORK AUTHENTICATION METHOD AND NETWORK AUTHENTICATION SERVER

This application is based upon and claims the benefit of priority from Japanese Patent Application No. 2015-065388, filed on 27 Mar. 2015, the disclosure of which is incorporated herein in its entirety by reference.

TECHNICAL FIELD

The disclosed subject matter relates to an art of carrying out network authentication.

BACKGROUND ART

In a shared network environment such as a corporate network, a public network or the like, it is essential to secure network security. Also in a wired LAN environment, client authentication, which applies an authentication technology based on the IEEE 802.1X specification, becomes prevailing. A client authentication system based on IEEE 802.1X includes a client terminal (Supplicant) of a user, a server (Authentication Server) which holds user authentication information on the user and carries out authentication, and an authentication switch (Authenticator) which relays authentication information exchanged between the client terminal and the authentication server and controls network connection of the client terminal.

However, there is a trade-off between security and convenience, and thus a method for coping with both of securing security and making management convenient becomes an issue.

As an art related to the above, PTL (Patent Literature) 1 (Japanese Patent Application Laid-Open Publication No. 2004-350052) discloses an art for specifying at least one out of multi-cast groups to which a data block is sent from a wireless access point apparatus having the heaviest load in order to distribute loads among wireless access points while avoiding wasting communication band in a wireless section. Moreover, PTL 1 discloses an art for switching of connection to a wireless access point apparatus which has the lightest load on a wireless terminal which participates in the multi-cast group.

Moreover, PTL 2 (Japanese Patent Application Laid-Open Publication No. 2014-171078) discloses an art for flexibly changing an authentication switch, which passes an authentication packet, in an authentication network. In order to realize that change, a filter generation and notification unit is included. This unit determines the authentication switch which passes the authentication packet sent from a client terminal, based on checking health between an authentication server and the authentication switch, and generates a receiving port filter based on the determination, and sends the receiving port filter to each of the authentication switches.

SUMMARY

However, according to the invention described in PTL 1, it is necessary to send and receive load information and an identifier and the like in order to avoid wasting the communication band in the wireless section. Therefore, depending on a radio wave environment, the load converges at a point whose radio wave environment is good, and consequently load unbalance among the wireless access point apparatuses is caused.

Moreover, according to the invention which is described in PTL 2, depending on state of distribution and state of communication of terminals which need to be authenticated, the load converges on a specific authentication switch. As a result, there are cases that it is impossible to carry out appropriate load distribution.

An object of the disclosed subject matter, which is conceived in consideration of the above-mentioned point, is to provide an art enabling effective load distribution in effective network authentication in order to balance the effective network usage and securement of security by using large scale authentication capability with a plurality of authentication switches.

A network authentication system according to an exemplary aspect of the disclosed subject matter includes a client terminal, an authentication server which authenticates connection of the client terminal with an external network, and a plurality of authentication switches which control communication of the client terminal with the external network, wherein the authentication switch includes, an authentication server processing unit which notifies the authentication server of authentication terminal information indicating information on the client terminal authenticated by the authentication switch, and a receiving port filter which is included in the authentication switch and receives a specific packet, wherein the authentication server includes, a terminal management storing unit which stores the authentication terminal information, and an authentication switch management processing unit which, in order that the authentication switch authenticate the client terminal, determines filter information, that is set in the receiving port filter, based on the authentication terminal information, and notifies the authentication switch of the filter information, and wherein the authentication server processing unit updates the receiving port filter by use of the filter information.

A network authentication method of a network authentication according to an exemplary aspect of the disclosed subject matter, the method uses the network authentication system that includes, a client terminal, an authentication server which authenticates connection of the client terminal with an external network, and a plurality of authentication switches which control communication of the client terminal with the external network. The method includes: notifying, by the authentication switch, the authentication server of authentication terminal information which indicates information on the client terminal authenticated by the authentication switch, determining, by the authentication server, filter information set in a receiving port filter, which is included in the authentication switch and receives a specific packet, based on the authentication terminal information, and notifies the authentication switch of the filter information, and updating, by the authentication switch, the receiving port filter by use of the filter information.

A network authentication server according to an exemplary aspect of the disclosed subject matter includes a terminal management storing unit which receives authentication terminal information, that indicates information on a client terminal, from a plurality of authentication switches controlling communication of the client terminal with an external network and authenticating the client terminal, and which stores the received authentication terminal information, and an authentication switch management processing unit which, in such a way that the authentication switch authenticates the client terminal, determines filter information set in the receiving port filter, that is included in the switch and receives a packet sent from the client terminal, based on the authentication terminal information, and notifies the authentication switch of the filter information.

BRIEF DESCRIPTION OF THE DRAWINGS

FIG. 1B is a block diagram showing an example of a configuration of an authentication server in the first exemplary embodiment of the disclosed subject matter.

FIG. 5 is a diagram showing contents of a filter management table in the first exemplary embodiment of the disclosed subject matter.

FIG. 6 is a diagram showing contents which a terminal management storing unit stores in the first exemplary embodiment of the disclosed subject matter.

FIG. 11B is a sequence diagram showing the load distribution process, whose trigger is the increase in the number of the communication terminals, in the first exemplary embodiment of the disclosed subject matter.

FIG. 13A is a sequence diagram showing a load distribution process, whose trigger is an increase of a communication traffic volume of a specific terminal, in the second exemplary embodiment of the disclosed subject matter.

EXEMPLARY EMBODIMENT

Hereinafter, an exemplary embodiment of the disclosed subject matter will be explained in detail with reference to drawings.

First Exemplary Embodiment

Figure 1A:
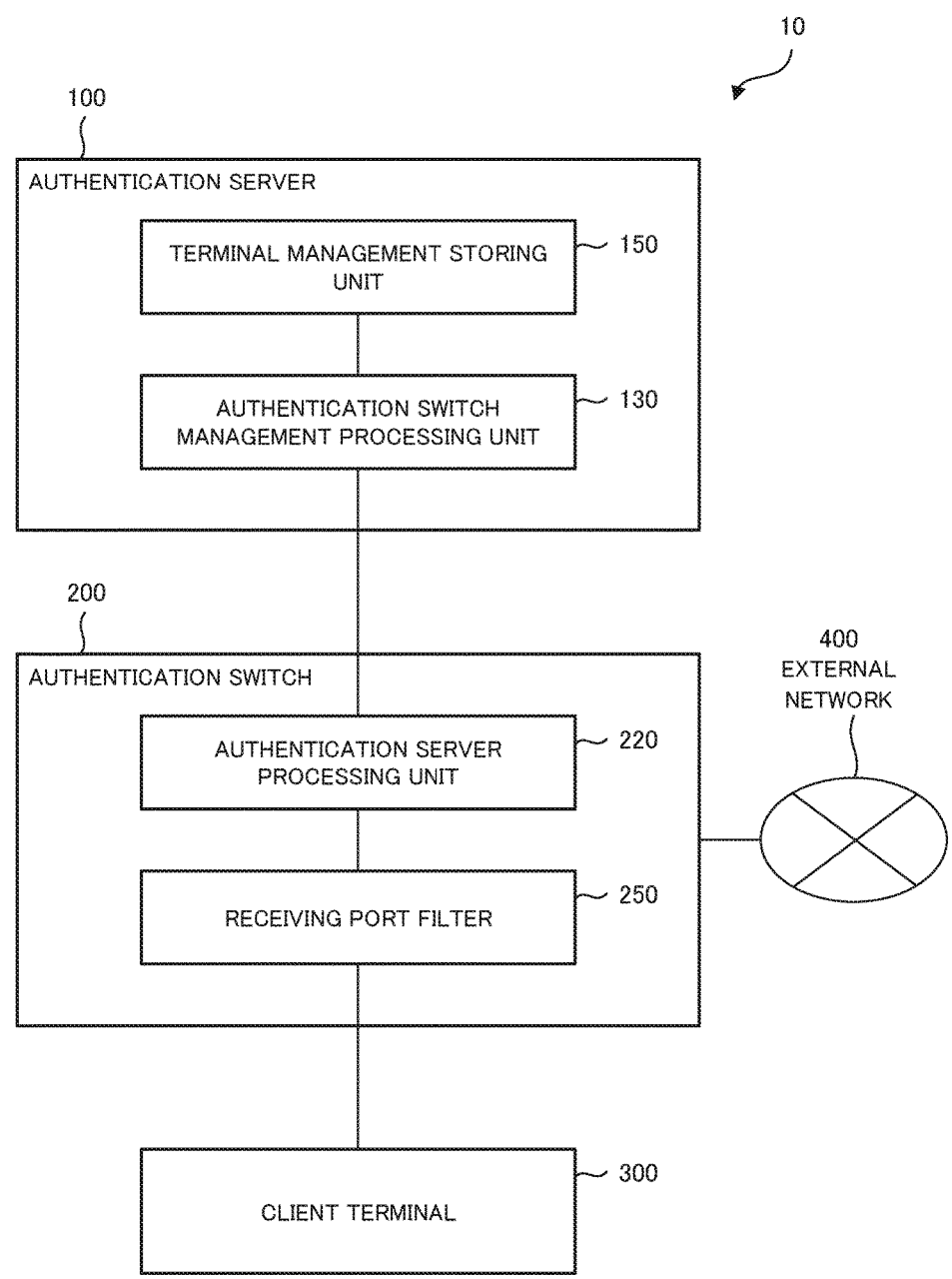
FIG. 1A is a diagram showing an example of a whole configuration of a network authentication system in a first exemplary embodiment of the disclosed subject matter.

With reference to FIGS. 1A to 1C, and FIG. 2, a configuration of a network authentication system of a first exemplary embodiment of the disclosed subject matter will be explained in the following. FIG. 1A is a diagram showing an example of a whole configuration of the network authentication system in the first exemplary embodiment.

Figure 1C:
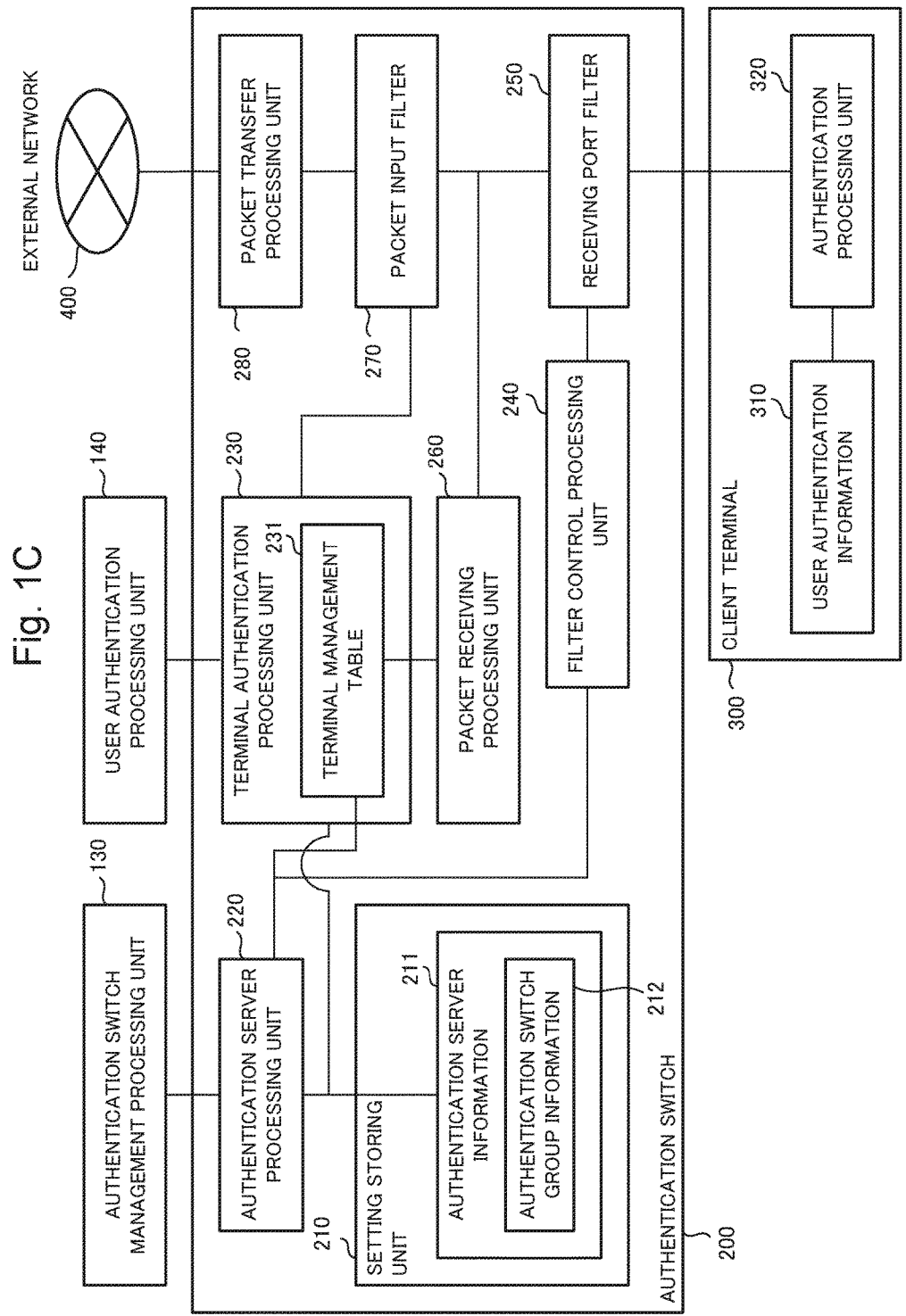
FIG. 1C is a block diagram showing an example of a configuration of an authentication switch in the first exemplary embodiment of the disclosed subject matter.
Figure 2:
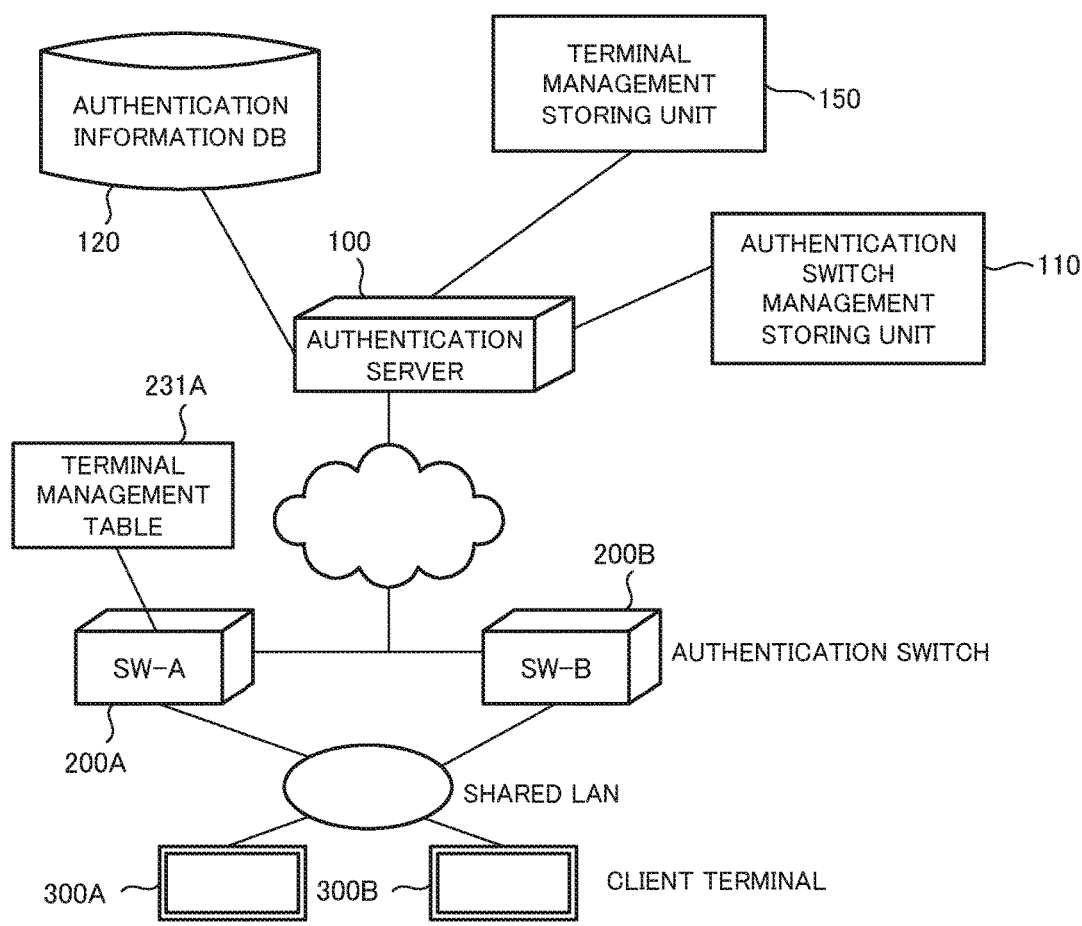
FIG. 2 is a network configuration diagram in the first exemplary embodiment of the disclosed subject matter.

FIG. 1B and FIG. 1C are block diagrams of the configuration of the network authentication system in the first exemplary embodiment. FIG. 2 is a network configuration diagram in the first exemplary embodiment.

FIG. 1A shows the minimum configuration to achieve the object of the disclosed subject matter. In FIG. 1A, a network authentication system 10 includes an authentication server 100, an authentication switch 200 (in the case of a configuration including a plurality of authentication switches, 200A, 200B (FIG. 3 and FIG. 4) . . . ), a client terminal 300 (in the case of a configuration including a plurality of client terminals, 300A, 300B (FIG. 3 and FIG. 4) . . . ) and an external network 400. A network authentication system 20 in the second exemplary embodiment, which will be described later, also includes the authentication server 100, an authentication switch 205, the client terminal 300 and the external network 400.

The network authentication system 10 includes the client terminal 300, the authentication server 100 which authenticates connection of the client terminal 300 with the external network 400, and a plurality of authentication switches 200 each of which controls communication of the client terminal 300 with the external network 400.

The authentication switch 200 includes an authentication server processing unit 220 which notifies the authentication server 100 of authentication terminal information indicating information on the client terminal 300 authenticated by the authentication switch 200, and a receiving port filter 250 which receives specific packets.

The authentication server 100 further includes a terminal management storing unit 150 which stores the authentication terminal information, and an authentication switch management processing unit 130. The authentication switch management processing unit 130 determines filter information, which is set in the receiving port filter 250, based on the authentication terminal information to enables the authentication switch 200 to authenticate the client terminal, and notifies the authentication switch 200 of the filter information. Furthermore, the authentication server processing unit 220 updates the receiving port filter 250 by use of the filter information.

According to the present exemplary embodiment, the effective load distribution may be achieved in the network authentication for balancing the effective network usage and securement of security by using large scale authentication capability with a plurality of authentication switches.

The reason is that the authentication server 100 receives information on the client terminal 300 which the authentication switch 200 authenticates, and can determine, based on the information on the client terminal 300, whether there is load unbalance among the authentication switches or not. Moreover, the reason is that it is possible to distribute the loads of the authentication switches by updating the receiving port filter 250 based on the determination as to whether the load unbalance exists or not.

Moreover, the authentication server 100 includes the terminal management storing unit 150 which stores the information on the client terminal 300 sent from the authentication switch 200, and consequently recognizes that which of the authentication switches authenticates which of the client terminals. The reason is that, by the above-mentioned recognition, the authentication server 100 can update the receiving port filter 250 without newly receiving the information on the client terminal 300 from the authentication switch 200. For example, the authentication server 100 can update the receiving port filter 250 in such a way that a client terminal, which was not authenticated by one authentication switch, is authenticated by another authentication switch.

Furthermore, the reason is that, according to the disclosed subject matter, the number of times that communications are conducted in the network authentication system 10 decreases in comparison with a case that the authentication switch 200 sends the information on the client terminal 300 every time the client terminal 300 authenticated by the authentication switch 200 is changed, and consequently it is possible to cope with both of securing security and making network usage efficient.

Here, a detailed operation of each component of the authentication server 100 and the authentication switch 200 will be explained in the following with reference to FIG. 1B and FIG. 1C.

In FIG. 1B, the authentication server 100 includes an authentication switch management storing unit 110, an authentication information database 120 which stores information for authenticating the client terminal 300, the authentication switch management processing unit 130, a user authentication processing unit 140 which carries out a process of authenticating the client terminal 300, and the terminal management storing unit 150 which stores information for terminal management. Here, the authentication database 120 may be arranged outside the authentication server 100.

The authentication switch management storing unit 110 internally includes a filter management table 111. The filter management table 111 stores the filter information of the receiving port filer of each authentication switch.

The authentication switch management processing unit 130 includes a filter generation and notification processing unit 131 and a switch monitor processing unit 132. In order to carry out a health check, the switch monitor processing unit 132 periodically communicates with the authentication server processing unit 220 of the authentication switch 200. Here, the health check means to check a working state of the authentication switch 200. The filter generation and notification processing unit 131 generates filter information to be set in the receiving port filter of each authentication switch and stores the filter information in the filter management table 111 in such a way that the client terminal is authenticated by any one of the authentication switches which belong to the same group. In the case of a configuration including a plurality of the authentication switches, the filter generation and notification processing unit 131 notifies the authentication switch 200A and the authentication switch 200B of the filter information of the receiving port filter.

In FIG. 1C, the authentication switch 200 includes a setting storing unit 210, the authentication server processing unit 220, a terminal authentication processing unit 230, a filter control processing unit 240, the receiving port filter 250, a packet receiving processing unit 260, a packet input filter 270, and a packet transfer processing unit 280.

The setting storing unit 210 stores authentication server information 211. The authentication server information 211 includes authentication switch group information 212.

In order to carry out the health check, the authentication server processing unit 220 periodically communicates with the switch monitor processing unit 132 of the authentication server 100. The authentication server processing unit 220 instructs the filter control processing unit 240 to carry out setting of the receiving port filter 250.

The terminal authentication processing unit 230 stores a terminal management table 231.

The receiving port filter 250 is a filter to determine whether a specific packet is received or not. For example, when the authentication server processing unit 220 sets the receiving port filter 250 to discard all packets, even if the client terminal 300 sends an authentication request packet to the authentication switch 200, all request packet is discarded and the authentication process is not started.

The packet receiving processing unit 260 receives the authentication request packet which passes through the receive port filter 250. Moreover, the packet receiving processing unit 260 notifies the terminal authentication processing unit 230 of the authentication request packet.

The packet input filter 270 is a filter which controls communication of the client terminal 300 with the external network 400.

The packet transfer processing unit 280 transfers communication traffic, which is generated by the client terminal 300, to the external network 400.

The client terminal 300 includes user authentication information 310 and an authentication processing unit 320.

A network configuration diagram in the present exemplary embodiment will be explained in the following with reference to FIG. 2.

The authentication switches 200A and 200B, and the client terminals 300A and 300B are connected each other through a shared LAN, and the authentication switch 200 controls communication of the client terminal 300 with the external network.

The authentication switch 200A and the authentication switch 200B communicate with the authentication server 100 through a network. The authentication server 100 and each of the authentication switches 200A and 200B may be connected through an external network or may be in an environment of not being connected through the external network but being connected through the same LAN. Moreover, the authentication server 100 may be a single server on a network from a view point of each authentication switch. As an actual form, the authentication server 100 may be one server, or may be a server system which includes a plurality of servers and has superior availability.

Next, an operation of the first exemplary embodiment will be explained.

Figure 3:
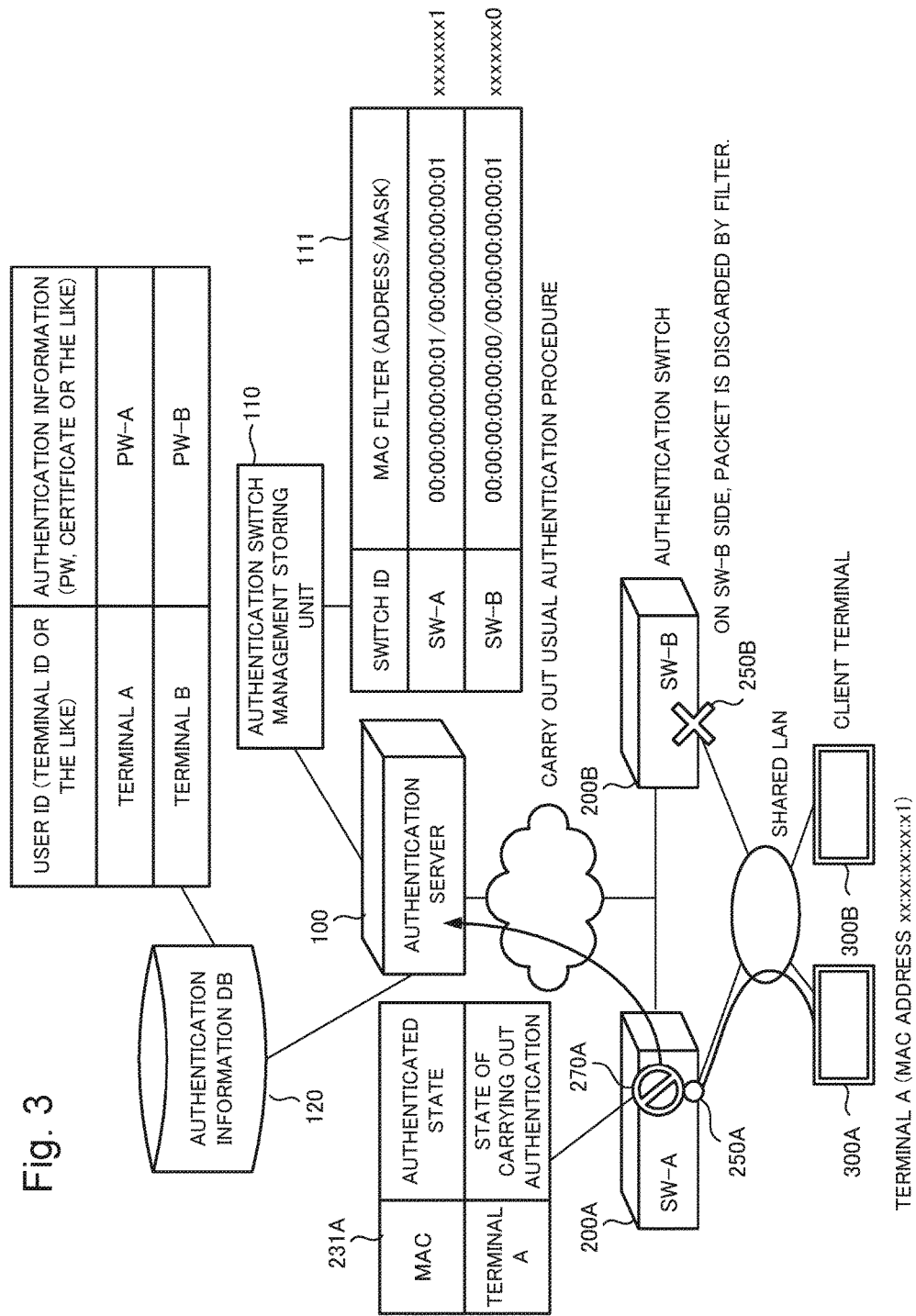
FIG. 3 is a diagram showing an authentication process which is carried out between a terminal and any one of two authentication switches in a network authentication system relating to the disclosed subject matter.
Figure 4:
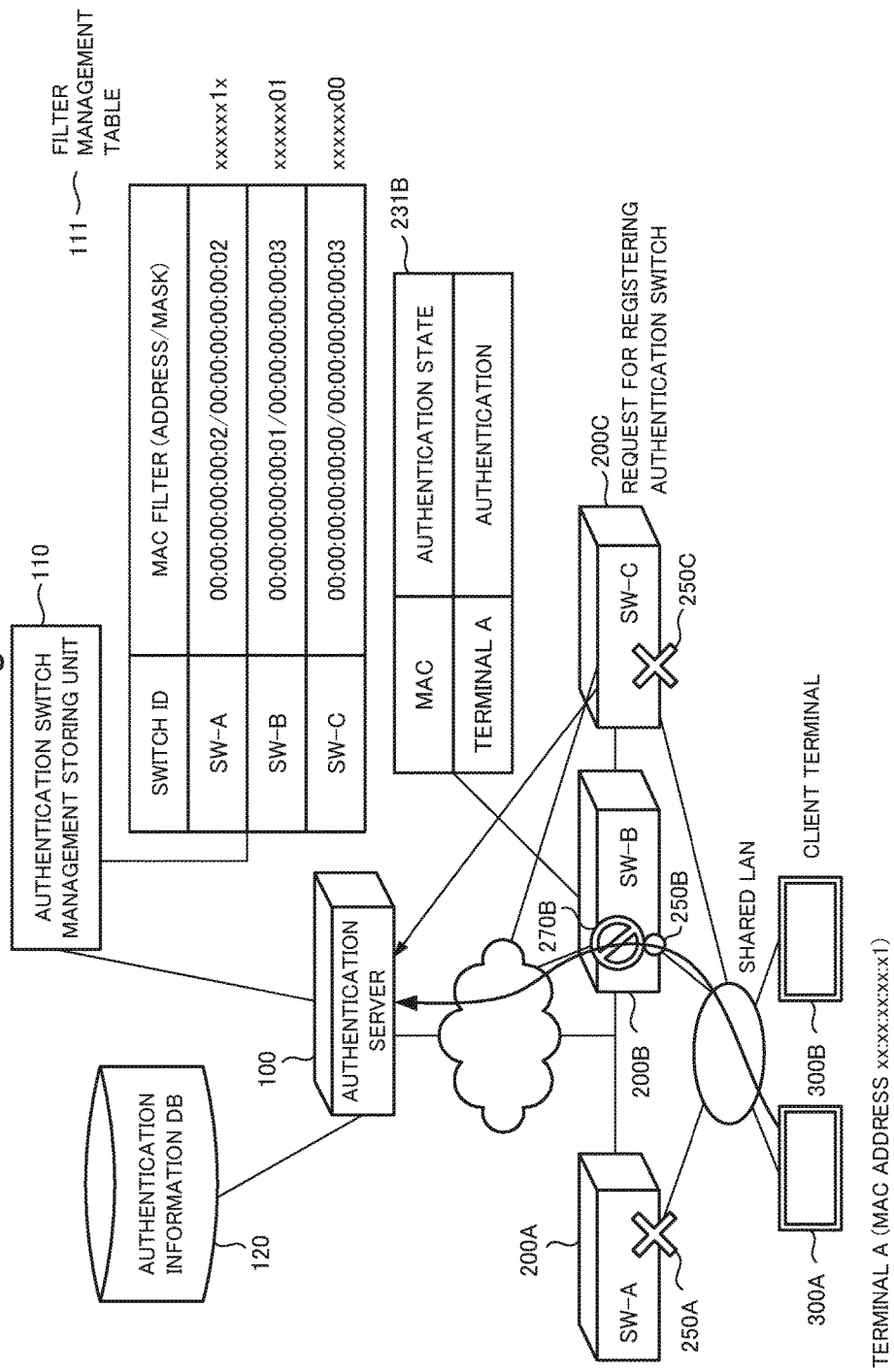
FIG. 4 is a diagram for illustrating an operation, which is carried out when an authentication switch is added in the network authentication system relating to the disclosed subject matter, with reference to a network configuration diagram.

Firstly, an operation of a network authentication system, which is relating to the disclosed subject matter, will be explained in the following with reference to FIG. 3 and FIG. 4. FIG. 3 is a diagram showing an authentication process which is carried out between the terminal 300A and one of the authentication switch 200A and the authentication switch 200B in the network authentication system relating to the disclosed subject matter. Here, components to which A, B and C are assigned indicate internal configurations of, for example, 200A, 200B and 200C respectively.

In FIG. 3, addresses or identification information (switch ID (Identifier)) of the authentication switch 200A and the authentication switch 200B are registered with the authentication server 100. Then, the authentication switch 200A and the authentication switch 200B independently carry out the terminal authentication. In order to carry out the above, the authentication server 100 generates the filter information which is set in the receiving port filter of each authentication switch, and notifies the authentication switch 200A and the authentication switch 200B of the generated filter information. The authentication switches 200A and 200B update receiving port filters 250A and 250B respectively based on the notified filter information. Moreover, a packet input filter of the authentication switch 200A is a packet input filter 270A.

When the receiving port filter 250A passes authentication information, which are included in the authentication request packet send from the terminal 300A, and a MAC (Media Access Control) address without discarding the authentication information and the MAC address, and the receiving port filter 250B discards the authentication information and the MAC address, the terminal 300A sends the authentication request packet to the authentication switch 200A, and the authentication switch 200A starts the authentication process. The authentication switch 200A queries the authentication server 100 about the authentication information of the terminal 300A. By comparing the authentication information of the terminal 300A with information which is stored in the authentication information database 120, the authentication server 100 determines whether authentication is permitted or not, and then the authentication server 100 sends the determination as to whether the authentication is permitted or not to the authentication switch 200A. The authentication switch 200A notifies the terminal 300A of an authentication result, and when the authentication results in success, the authentication switch 200A updates the packet input filter 270A so as to it is permit the terminal 300A to access the external network 400 through the authentication switch 200A.

An operation, which is carried out when the authentication switch 200C is added to the authentication network in operation, in the network authentication system relating to the disclosed subject matter, will be explained in the following with reference to FIG. 4. FIG. 4 is a diagram for illustrating an operation, which is carried out when an authentication switch is added to a working network, with reference to a network configuration.

The authentication switch 200C is registered with the authentication server 100 as the authentication switch, and the authentication server 100 generates the filter information to be set in the receiving port filters of the authentication switches 200A, 200B and 200C, and notifies the authentication switches 200A, 200B and 200C of the filter information of the receiving port filters of the authentication switches 200A, 200B and 200C respectively. The authentication switches 200A, 200B and 200C update the receiving port filters 250A, 250B and 250C, respectively, based on the filter information.

As a result of updating the receiving port filter, for example, an authentication and communication process for the terminal 300A is moved from the authentication switch 200A to the authentication switch 200B. However, when the authentication switch 200B does not store the authentication information of the terminal 300A, the terminal 300A is reauthenticated in the authentication switch 200A.

As mentioned above, in the network authentication system relating to the disclosed subject matter, there are some cases that, depending on the state of distribution and the state of communication the terminals to be authenticated, loads may converge on a specific authentication switch (for example, authentication switch 200A) due to the regeneration and update process of the receiving port filter, preventing from carrying out the appropriate load distribution.

In order to make an improvement in such cases, the present exemplary embodiment, seeks to improve the network load occurred during the re-authentication process of the terminal, by making the authentication server 100 stores the information for the terminal management in the terminal management storing unit 150 as shown in FIG. 6 and by devising a method of generating the filter at the time of regenerating the receiving port filter, as described in the following.

An operation of the present exemplary embodiment will be explained in the following with reference to FIG. 1B, FIG. 1C, and FIG. 5 to FIG. 11.

The authentication server processing unit 220 of the authentication switch 200 periodically communicates with the switch monitor processing unit 132 of the authentication switch management processing unit 130 of the authentication server 100. In this communication process, the authentication server processing unit 220 of the authentication switch 200 acquires information of the terminal management table 231 included in the terminal authentication processing unit 230, and notifies the authentication switch management processing unit 130 included in the authentication server 100. The authentication switch management processing unit 130 stores the information of the terminal management table 231, of which each authentication switch notifies, in the terminal management storing unit 150.

Figure 7:
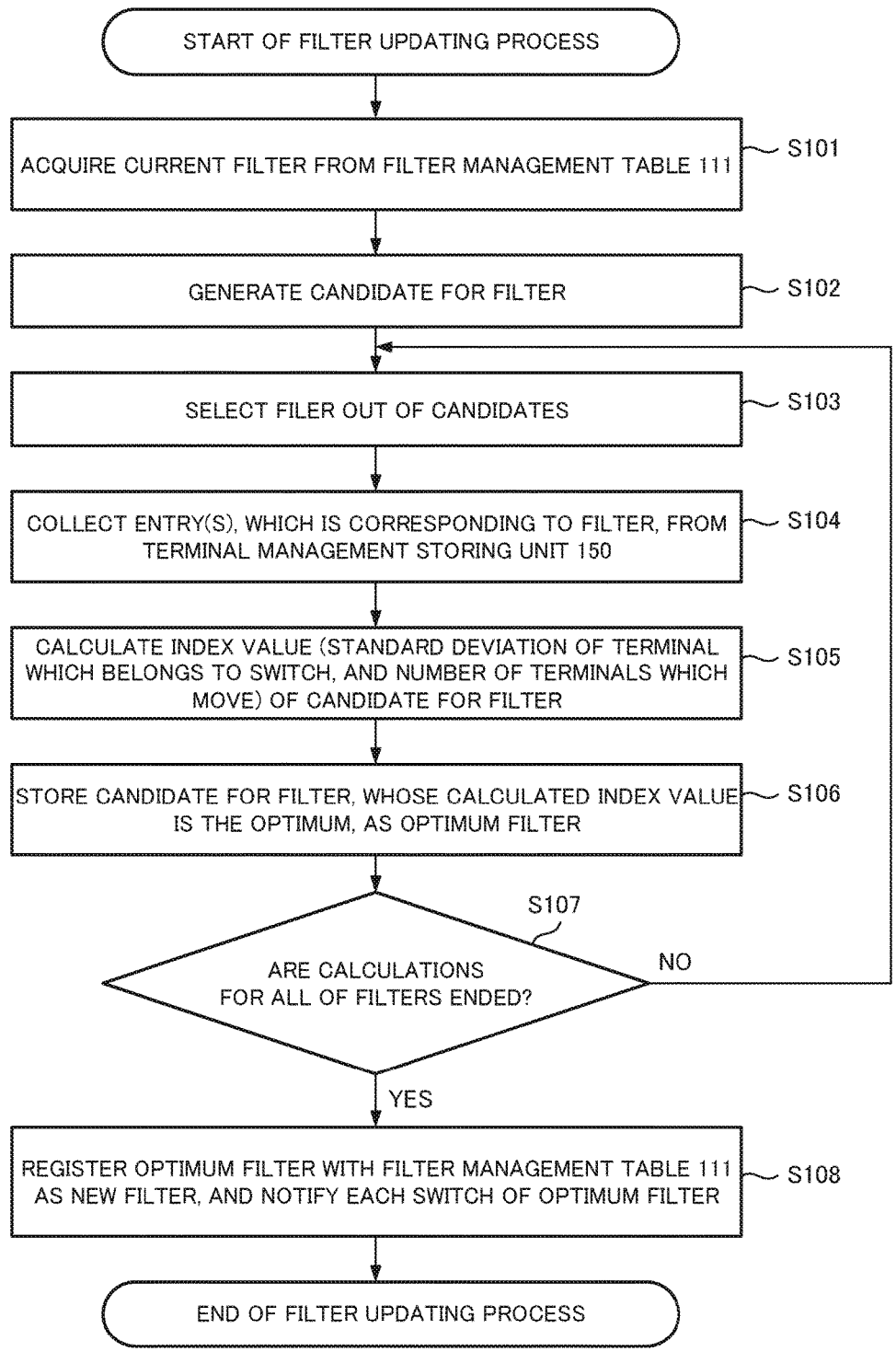
FIG. 7 is a flowchart showing an operation of a filter generation and notification processing unit in the first exemplary embodiment of the disclosed subject matter.

Meanwhile, when regenerating the receiving port filter of each authentication switch, for example, when registering or deleting the authentication switch, etc., the filter generation and notification processing unit 131 carries out a process shown in FIG. 7.

FIG. 7 is a flowchart showing an operation of the filter generation and notification processing unit 131. In FIG. 7, firstly, the filter generation and notification processing unit 131 acquires the filter information of the receiving port filter, which is currently set in each authentication switch, from the filter management table 111 (Step S101).

FIG. 5 shows an example of the filter management table 111. FIG. 5 is a diagram showing contents of the filter management table 111, and shows an example of information on a MAC filter filtering a MAC address included in each of SW-A and SW-B which are switch IDs.

Next, based on the acquired filter information of the receiving port filter, the filter generation and notification processing unit 131 generates all of filter candidate values F1, F2, . . . , Fk, . . . , Fn of the receiving port filters which have the minimum hamming distance (Step S102). Each filter candidate value Fk is a set of filter values {fk1, fk2, . . . , fks} (s: the number of the authentication switches) to be notified each authentication switch. For each filter candidate value Fk which is generated, the filter generation and notification processing unit 131 selects at least one out of the filter values fk1, fk2, . . . , fks based on the terminal management storing unit 150 (Step S103), and collects terminal entries which are corresponding to the selected filter values (Step S104), and calculates an index value Sk, which is associating with the filter candidate value, based on the collected terminal entries (Step S105).

FIG. 6 shows an example of the terminal management storing unit 150. FIG. 6 is a diagram showing contents of the terminal management storing unit 150. A terminal address of each client terminal, the switch ID of the authentication switch to which the client terminal belongs (abbreviated as belonging switch), and a communication traffic volume are registered. Here, the communication traffic volume may not be used in the present exemplary embodiment.

Figure 8:
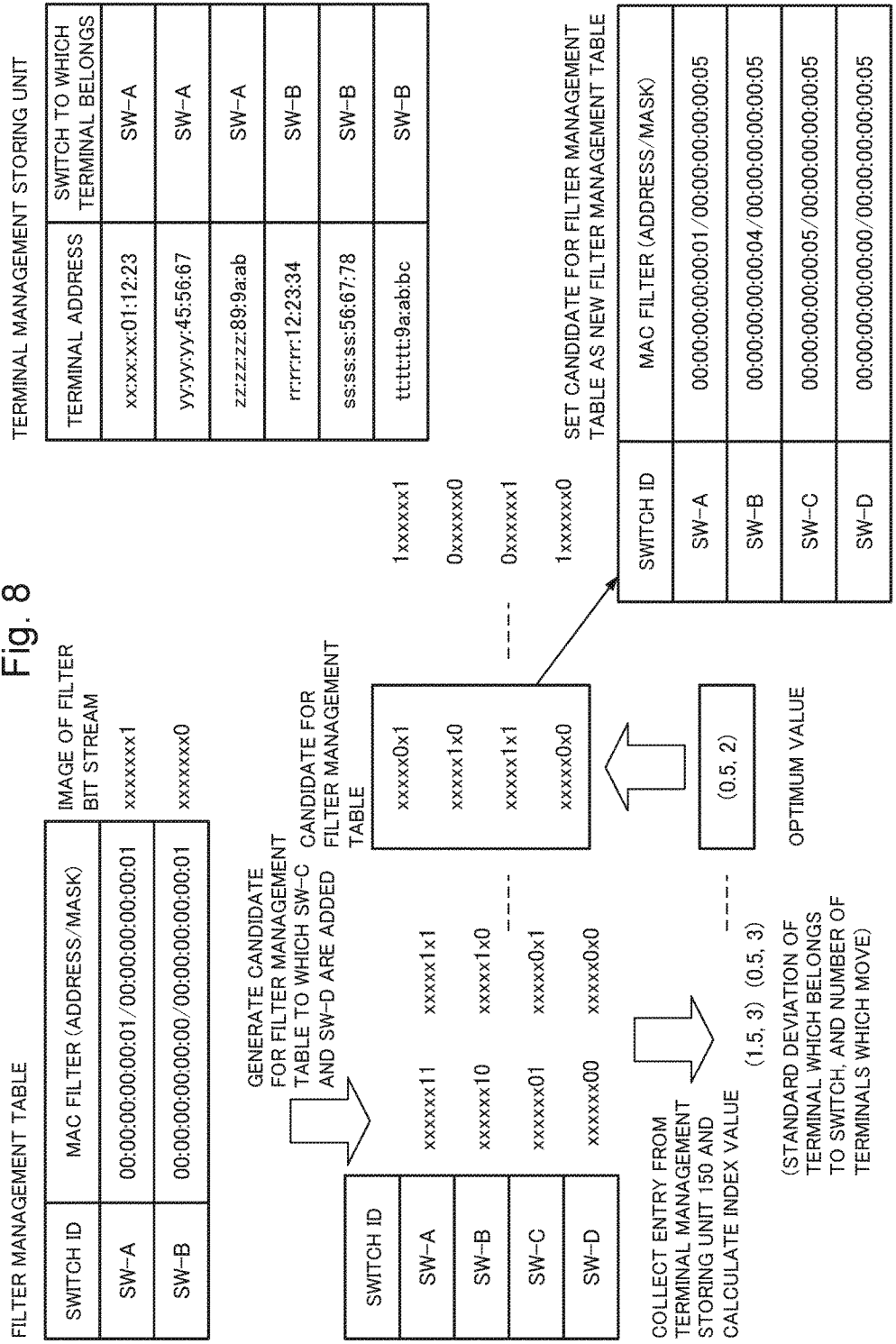
FIG. 8 is a diagram illustrating an operation of the filter generation and notification processing unit in the first exemplary embodiment of the disclosed subject matter.

In the examples of FIG. 7 and FIG. 8, the standard deviation on the number of the terminals in the respective filter value fk1, fk2, . . . , fks and the number of terminals, which move between the authentication switches, are used as the index value. However, another index may be used. That is, since the standard deviation indicates variation in the number of the terminals, if an index value, which indicates that the variation is small and the number of movements among the authentication switches is small, is selected as the optimum value, it is realized that the loads are distributed efficiently.

If the newly calculated index value Sk is the optimum value in comparison with the index values which were calculated previously, the filter generation and notification processing unit 131 stores the filter candidate value Fk, which is associating with the index value, in the filter management table 111 as the filter information of the optimum filter (Step S106). After repeatedly carrying out the above-mentioned S103 to S106 to each of the filter candidate values (Step S107), the filter generation and notification processing unit 131 registers the filter candidate value, which is stored as the optimum filter, in the filter management table 111 as a new filter, and each authentication switch is notified of the filter candidate value (Step S108).

FIG. 8 is a diagram illustrating the operation of the filter generation and notification processing unit 131. Switch IDs SW-C and SW-D, which are switch IDs of the authentication switch 200C and the authentication switch 200D (not shown in the drawing) respectively, are listed in FIG. 8 in addition to the IDs SW-A and SW-B which are the switch IDs of the authentication switch 200A and the authentication switch 200B respectively. In this case, candidates for the filter management table, to which SW-C and SW-D are added, are generated, and the optimum value out of the candidates is sought. For example, for each of the candidates for the filter management table to which SW-C and SW-D are added, the standard deviation on numbers of the terminals which belong to SW-C and SW-D respectively, and the number of the terminals which move among the authentication switches are calculated. The candidate for the filter management table, which has the optimum value among the candidates, is selected. The selected candidate for the filter management table is set as a new filter management table.

Figure 9:
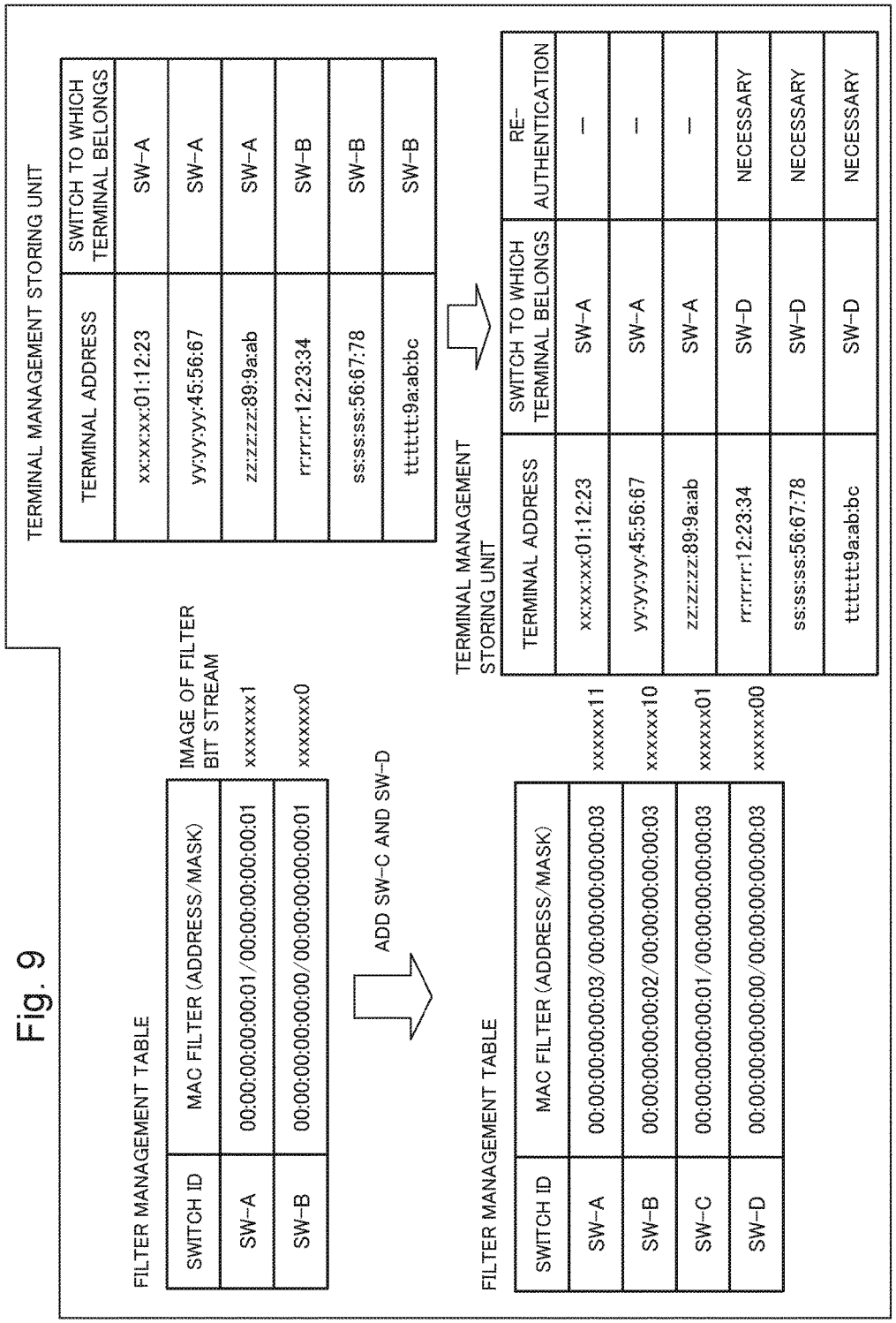
FIG. 9 is a diagram illustrating an updating operation of a filter which is updated by the network authentication system relating to the disclosed subject matter.

FIG. 9 is a diagram illustrating the filter which is updated by the network authentication system relating to the disclosed subject matter. As shown in FIG. 9, in the case of the filter which is updated by the network authentication system relating to the disclosed subject matter, a situation of terminal's address distribution is not taken into consideration. As a result, the terminals are unevenly distributed. That is, while SW-C and SW-D are added to the filter management table, the terminal management storing unit 150 indicates that the terminals unevenly belong to only the belonging switch SW-A and SW-D. Moreover, since SW-D is added afterward, the terminal management storing unit 150 indicates that it is necessary for SW-D to carry out a reauthentication.

Figure 10:
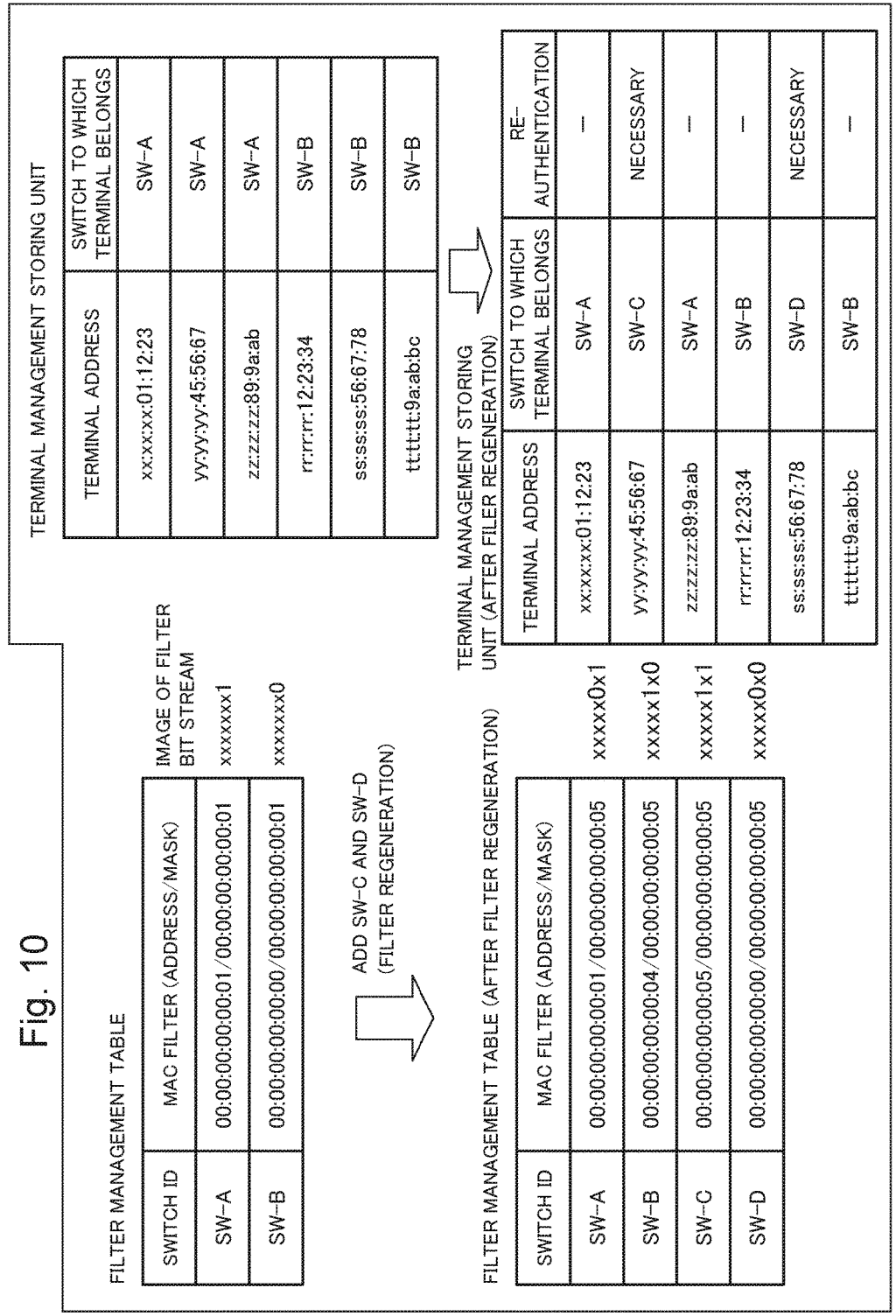
FIG. 10 is a diagram illustrating an another updating operation of a filter which is updated by the network authentication system in the first exemplary embodiment of the disclosed subject matter.

An effect of the filter information which is generated in Step S108 is shown in FIG. 10. FIG. 10 is a diagram illustrating the filter which is updated by the network authentication system of the present exemplary embodiment. As shown in FIG. 10, when regeneration of the filter is carried out by use of the filter regeneration method of the present exemplary embodiment, the filter candidate value is selected in such a way that the number of movements among the authentication switches is small. Thus, the filter is updated in such a way that the number of exchanges of the terminal address among the authentication switches is reduced to the minimum and that the load distribution is carried out appropriately among the authentication switches. That is, while SW-C and SW-D are added to the filter management table 111 which is generated after regeneration of the filter information, in the terminal management storing unit 150 which is generated after regeneration of the filter information, the terminals are distributed among the belonging switches having IDs of SW-A, SW-B, SW-C and SW-D.

Figure 11A:
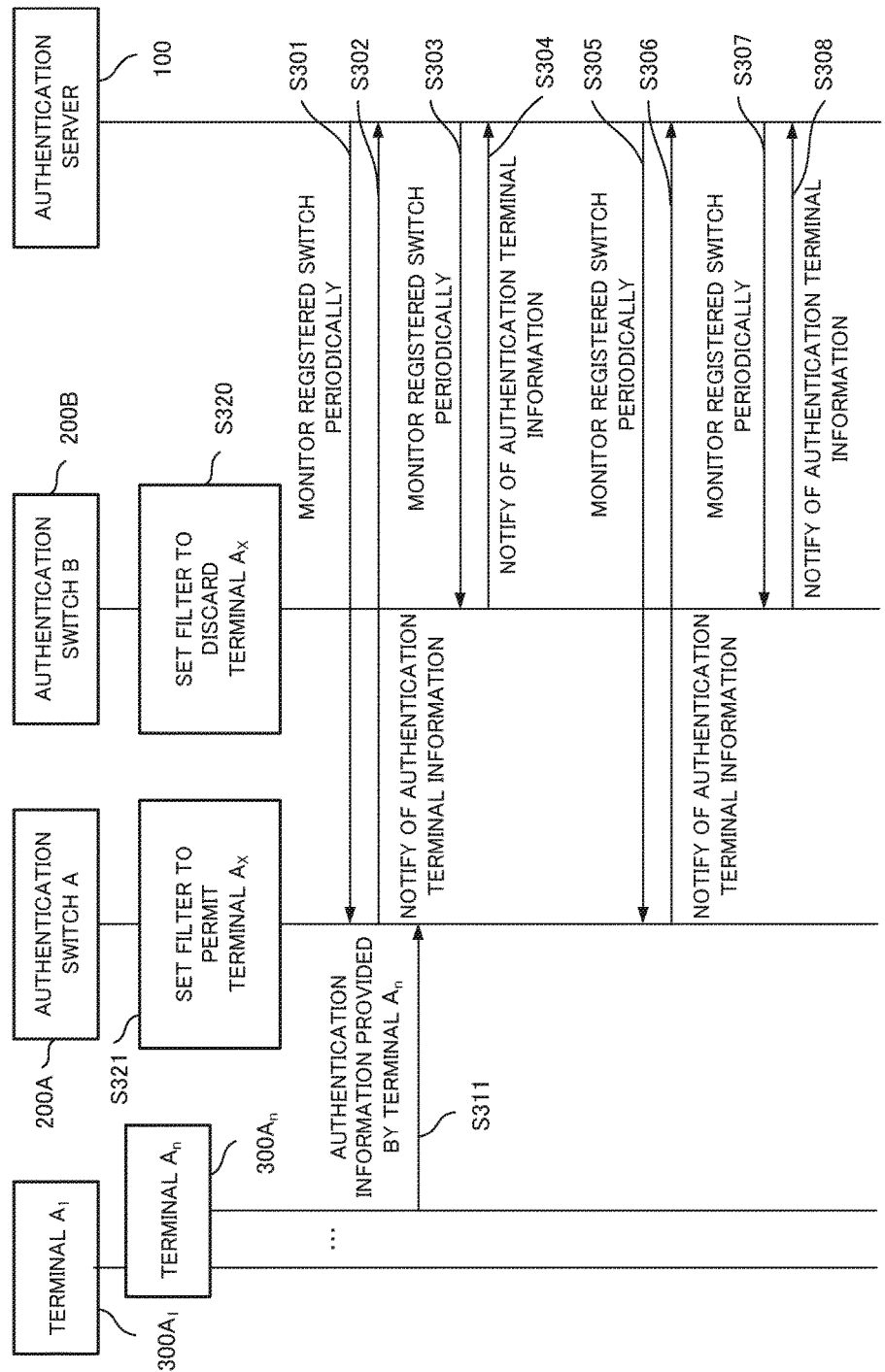
FIG. 11A is a sequence diagram showing a load distribution process, whose trigger is an increase in the number of communication terminals, in the first exemplary embodiment of the disclosed subject matter.

Each of FIG. 11A and FIG. 11B is a sequence diagram showing a load distribution process whose trigger is an increase in the number of the communication terminals.

In FIG. 11A, it is assumed that the authentication switch 200A has a filter setting of permitting a packet of a terminal Ax (x is any one of integers 1 to n) (Step S321), and the authentication switch 200B has a filter setting of discarding the packet of the terminal Ax (x is any one of integers 1 to n) (Step S320). The authentication server 100 carries out periodical communication for monitoring each authentication switch (Step S301 and Step S303). The authentication switch 200A and the authentication switch 200B send the authentication terminal information, which indicates information on the terminal authenticated by the authentication switch, to the authentication server 100 (Step S302 and Step S304).

When the authentication information, which is provided by the terminal An, is given to the authentication switch 200A (Step S311), the authentication server 100 (switch monitor processing unit 132) carries out the periodical communication for monitoring each authentication switch (Step S305 and Step S307), and the authentication switch 200A and the authentication switch 200B respectively notify the authentication server 100 of the authentication terminal information (Step S306 and Step S308).

In FIG. 11B, when the authentication server 100 (filter generation and notification processing unit 131) detects that the number of the authentication terminals at to the authentication switch 200A increases (Step S322), the authentication server 100 generates the filter information to be set in the receiving port filter of each authentication switch (Step S323), and notifies each authentication switch of the filter information (Step S309 and Step S310). Each authentication switch, which receives the filter information, sets the filter. For example, the authentication switch 200A sets the filter so as to discard a packet of a terminal A1 (Step S325), and the authentication switch 200B sets the filter to permit the packet of the terminal A1 (Step S324).

The switch monitor processing unit 132 of the authentication server 100 can detect a change in the number of the terminals, which the authentication switch authenticates, as a deviation of load of the authentication switch. When the switch monitor processing unit 132 of the authentication server 100 detects the change in the number of the terminals which the authentication switch authenticates, by the filter generation and notification unit 131's carrying out the above-mentioned filter information generation process, it is possible to appropriately re-assign the loads to the authentication switches and to suppress the network load.

As mentioned above, according to the present exemplary embodiment, the authentication server 100 stores the terminal management storing unit 150, and the authentication switch 200 periodically notifies the authentication server 100 of the authentication terminal information. This allows to carry out the load distribution whose trigger is the increase in the number of the authentication terminals.

Therefore, according to the present exemplary embodiment, the effective load distribution may be achieved in the network authentication for balancing the effective network usage and securement of security by using large scale authentication capability with a plurality of authentication switches.

Second Exemplary Embodiment

Figure 12A:
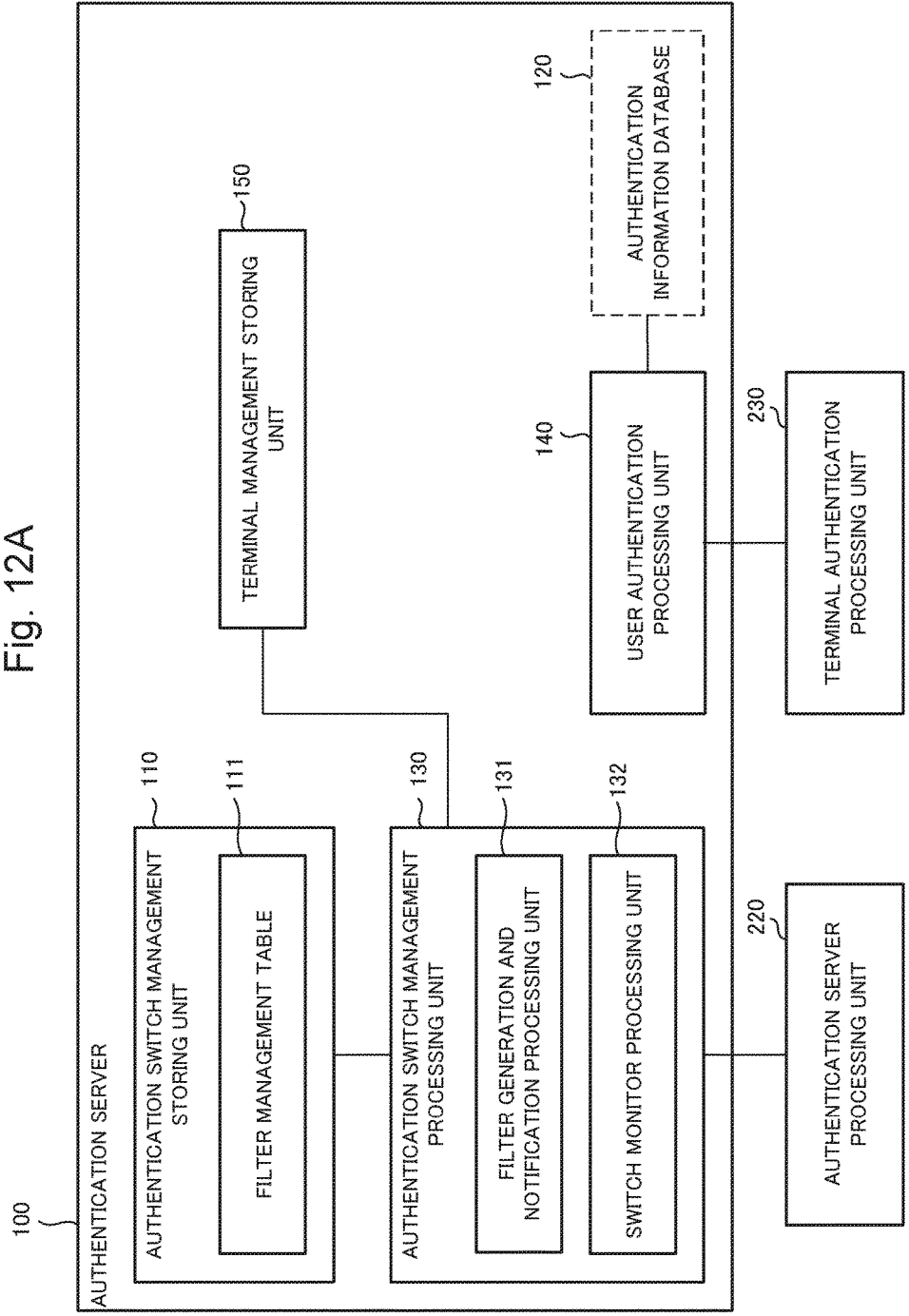
FIG. 12A is a block diagram showing a configuration of an authentication server in a second exemplary embodiment of the disclosed subject matter.
Figure 12B:
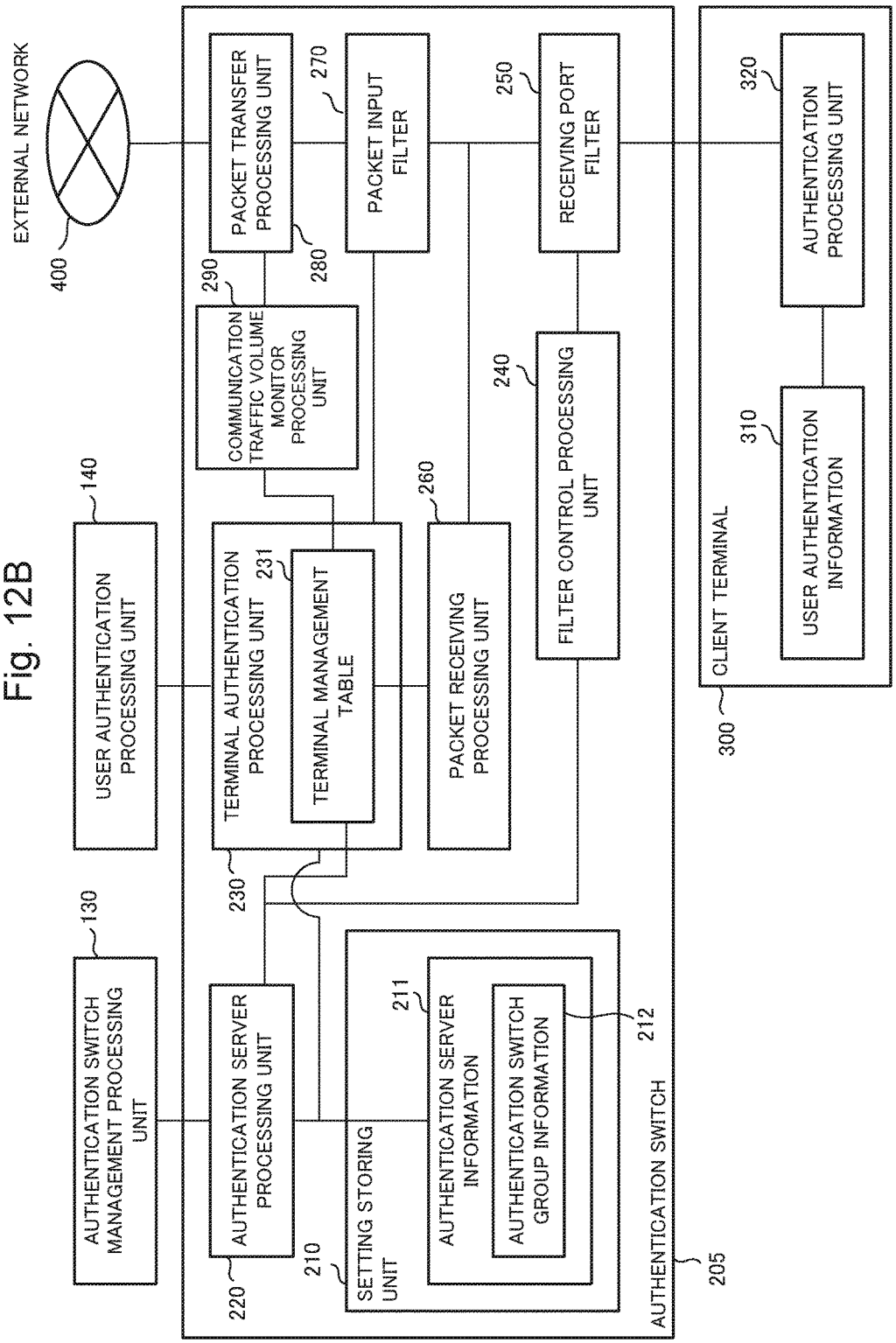
FIG. 12B is a block diagram showing a configuration of an authentication switch in the second exemplary embodiment of the disclosed subject matter.
Figure 13B:
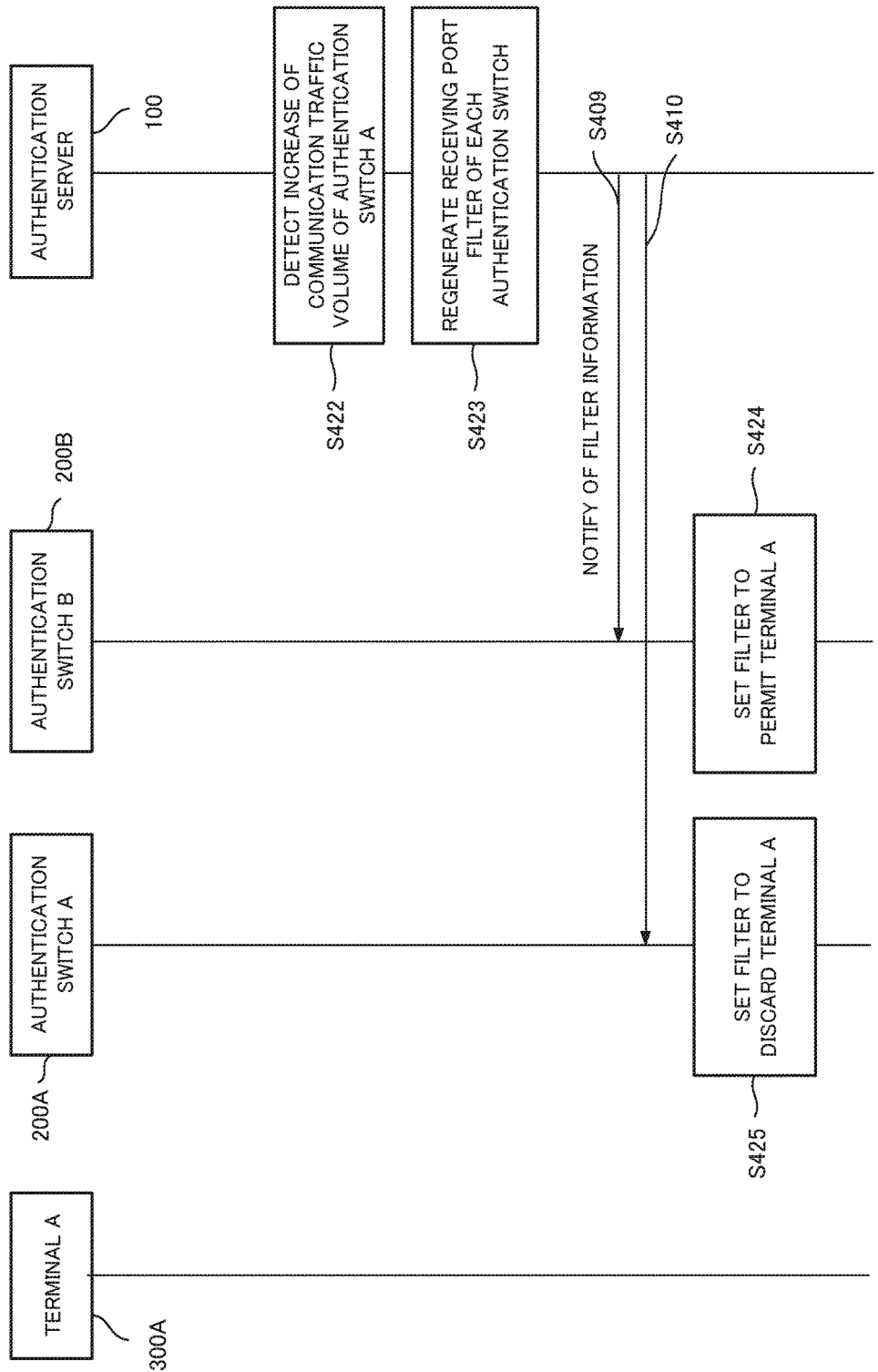
FIG. 13B is a sequence diagram showing the load distribution process, whose trigger is the increase of the communication traffic volume of the specific terminal, in the second exemplary embodiment of the disclosed subject matter.

A second exemplary embodiment of the disclosed subject matter will be illustrated with reference to FIG. 12A, FIG. 12B, FIG. 13A and FIG. 13B. FIG. 12A and FIG. 12B are diagrams showing configurations of a network authentication system of the second exemplary embodiment. FIG. 13A and FIG. 13B are sequence diagrams each of which shows a load distribution process carried out when a communication traffic volume of a specific terminal increases.

In FIG. 12A and FIG. 12B, a component which is the same as the component of the first exemplary embodiment is assigned the same number, and explanation on the component is omitted. A network authentication system 20 in FIG. 12A includes the authentication server 100, the authentication switch 205, the client terminal 300, and the external network 400. A configuration of the present exemplary embodiment further includes a communication traffic volume monitor processing unit 290 in the authentication switch 200 of the first exemplary embodiment.

In FIG. 12B, the communication traffic volume monitor processing unit 290 monitors a communication traffic volume at the packet transfer processing unit 280, and notifies the terminal authentication processing unit 230 of the monitored communication traffic volume.

Moreover, by making the terminal management table 231 of the authentication switch 205 and the authentication terminal storing unit 150 of the authentication server 100 store data on the communication traffic volume of each terminal, even if a communication traffic volume of the specific authentication switch or the specific terminal increases suddenly, it is also possible to carry out a quarantine process or the like by isolating only the specific terminal within the specific authentication switch.

Each of FIG. 13A and FIG. 13B shows a load distribution process which is carried out when the communication traffic volume of the specific terminal 300A increases. In FIG. 13A, it is assumed that the authentication switch 200A has a filter setting of permitting a packet of a terminal A (Step S421), and the authentication switch 200B has a filter setting of discarding the packet of the terminal A (Step S420). The authentication server 100 carries out periodical communication for monitoring each authentication switch (Step S401 and Step S403). The authentication switch 200A and the authentication switch 200B respectively notify the authentication server 100 of the authentication terminal information which includes the communication traffic volume of the terminal (Step S402 and Step S404).

When the authentication switch 200A is notified of an increase of the communication traffic volume of the terminal A (Step S411), the authentication server 100 (switch monitor processing unit 132) carries out the periodical communication for monitoring each authentication switch (Step S405 and Step S407), and the authentication switch 200A and the authentication switch 200B respectively notify the authentication server 100 of the authentication terminal information which includes the communication traffic volume of the terminal (Step S406 and Step S408).

In FIG. 13B, when the authentication server 100 (filter generation and notification processing unit 131) detects an increase of the communication traffic volume of the authentication switch 200A (Step S422), the authentication server 100 regenerates the filer information to be set in the receiving port filter of each authentication switch (Step S423), and notifies each authentication switch of the filter information (Step S409 and Step S410). Each authentication switch, which receives the filter information, carries out the filter setting. For example, the authentication switch 200A sets the filter to discard the packet of the terminal A (Step S425), and the authentication switch 200B sets the filter to permit the packet of the terminal A (Step S424).

As mentioned above, the switch monitor processing unit 132 of the authentication server 100 carries out the periodical communication for monitoring each authentication switch, and the authentication server processing unit 220 of the authentication switch 205 notifies the authentication server 100 of the authentication terminal information which includes the communication traffic volume. As a result, the switch monitor processing unit 132 of the authentication server 100 can detect, for example, a change in the communication traffic volume as a deviation of the communication traffic volume of the authentication switch 205.

When the switch monitor processing unit 132 detects the change in the communication traffic volume, the filter generation and notification processing unit 131 carries out the above-mentioned filter information generation process, and consequently it is possible to carry out appropriate re-assignment of the communication load among the authentication switches, and to suppress the network load. Alternatively, by isolating only the specific terminal, whose communication traffic volume increases, within the specific authentication switch, it is also possible to carry out the quarantine process or the like.

The increase in the number of the authentication terminals is checked in the first exemplary embodiment and the change in the communication traffic volume is checked in the second exemplary embodiment. Alternatively, both of the increase in the number of the authentication terminals and the change in the communication traffic volume may be checked.

As mentioned above, according to the invention of the present application, the authentication server stores the terminal management table, and generates the filter information with considering the change of the terminal, which is held by the terminal management table, based on the previously used filter at a time when generating the filter information to be set in the receiving port filter which is applied to the authentication switch. As a result, it is possible to carry out the appropriate load distribution.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable non transitory storage medium providing program code for use by or in connection with a computer or any instruction execution system. A computer-usable or computer-readable non transitory storage medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Here, the invention of the present application is not limited to the above-mentioned exemplary embodiments, and it is possible to variously change and modify the invention of the present application without departing from the gist of the invention of the present application, and to carry out the changed and modified invention of the present application.

The disclosed subject matter can be used as a network authentication system which can cope with both of securing security and making network usage effective.

10 network authentication system
100 authentication server
110 authentication switch management storing unit
111 filter management table
120 authentication information database
130 authentication switch management processing unit
131 filter generation and notification processing unit
132 switch monitor processing unit
140 user authentication processing unit
150 terminal management storing unit
20 network authentication system
200 authentication switch
205 authentication switch
210 setting storing unit
211 authentication server information
212 authentication switch group information
220 authentication server processing unit
230 terminal authentication processing unit
231 terminal management table
240 filter control processing unit
250 receiving port filter
260 packet receiving processing unit
270 packet input filter
280 packet transfer processing unit
290 communication traffic volume monitor processing unit
300 client terminal
310 user authentication information
320 authentication processing unit
400 external network

The invention claimed is:

1. A network authentication system comprising:
a client terminal;
an authentication server comprising memory configured to authenticate a connection of the client terminal with an external network; and
a plurality of authentication switches configured to control communication between the client terminal and the external network, wherein
an authentication switch of the plurality of authentication switches notifies the authentication server of authentication terminal information indicating information on the client terminal authenticated by the authentication switch, and receives a specific packet,
the authentication server stores the authentication terminal information, determines filter information to be set in a receiving port filter based on the authentication terminal information so as to enable the authentication switch to perform authentication of the client terminal, notifies the authentication switch of the filter information, and updates the receiving port filter by use of the filter information;
wherein when a deviation of load of the authentication switch is detected, the authentication server adds new authentication switches, and updates the receiving port filter so that the deviation of the number of the client terminals which belong to the authentication switches is small, and the number of the terminals which move among the authentication switches is small,
wherein the authentication terminal information includes a total number of the client terminals which are authenticated by the authentication switch, and,
wherein when the total number of the client terminals increases, the authentication server determines the filter information to be set in the receiving port filter.

2. The network authentication system according to claim 1,
wherein the authentication switch monitors a communication traffic volume of a packet sent from the client terminal to the external network, and sends the communication traffic volume to the authentication switch, wherein
the authentication switch sends the authentication terminal information, which includes the communication traffic volume, to the authentication server, and,
wherein when the communication traffic volume increases, the authentication server determines the filter information to be set in the receiving port filter.

3. The network authentication system according to claim 1,
wherein the authentication switch monitors a communication traffic volume of a packet sent from the client terminal to the external network,
sends the authentication terminal information, which includes the communication traffic volume, to the authentication server, and,
wherein when the communication traffic volume satisfies a predetermined condition, the authentication server determines the filter information which is set in the receiving port filter.

4. A network authentication method of a network authentication system including a client terminal, an authentication server which authenticates connection of the client terminal with an external network, and a plurality of authentication switches which control communication of the client terminal with the external network, the network authentication method comprising:
notifying, by an authentication switch from the plurality of authentication switches, the authentication server of authentication terminal information which indicates information on the client terminal authenticated by the authentication switch,
determining, by the authentication server, filter information to be set in a receiving port filter, which is included in the authentication switch and receives a specific packet, based on the authentication terminal information, and notifies the authentication switch of the filter information, and
updating, by the authentication switch, the receiving port filter by use of the filter information;
wherein when a deviation of load of the authentication switch is detected, adding new authentication switches, and updating the receiving port filter so that the deviation of the number of the client terminals which belong to the authentication switches is small, and the number of the terminals which move among the authentication switches is small, wherein the authentication terminal information includes a total number of the client terminals which are authenticated by the authentication switch, and, wherein when the total number of the client terminals increases, the authentication server determines the filter information to be set in the receiving port filter.

5. The network authentication method according to claim 4, wherein the authentication switch monitors a communication traffic volume of a packet sent from the client terminal toward an external network, and sends the authentication terminal information, which includes the communication traffic volume, to the server, and, wherein when the communication traffic volume increases, the authentication server determines the filter information which is set in the receiving port filter.

6. The network authentication method according to claim 4, wherein the authentication switch monitors a communication traffic volume of a packet sent from the client terminal toward an external network, and sends the authentication terminal information, which includes the communication traffic volume, to the server, and, wherein when the communication traffic volume increases, the authentication server determines the filter information which is set in the receiving port filter.

7. A network authentication server comprising:

an authentication information database and memory, wherein the server is further configured to:

receive authentication terminal information, that indicates information on a client terminal, from a plurality of authentication switches controlling communication of the client terminal with an external network and authenticating the client terminal, and storing the authentication terminal information received;

determine filter information to be set in a receiving port filter to enable the authenticate the client terminal based on the authentication terminal information; and notify an authentication switch from the plurality of authentication switches of the filter information, the receiving port filter included in the authentication switch and receiving packets from the client terminal, wherein when a deviation of load of the authentication switch is detected, the authentication server adds new authentication switches, and updates the receiving port filter so that the deviation of the number of the client terminals which belong to the authentication switches is small, and the number of the terminals which move among authentication switches is small, wherein the authentication terminal information includes a total number of the client terminals which are authenticated by the authentication switch, and wherein when the total number of the client terminals increases, the authentication server determines the filter information to be set in the receiving port filter.

* * * * *